Sept. 16, 1941. S. E. FINLEY 2,256,281
APPARATUS FOR PREPARING BITUMINOUS CEMENT AGGREGATE COMPOSITIONS
Filed March 25, 1940 3 Sheets-Sheet 1
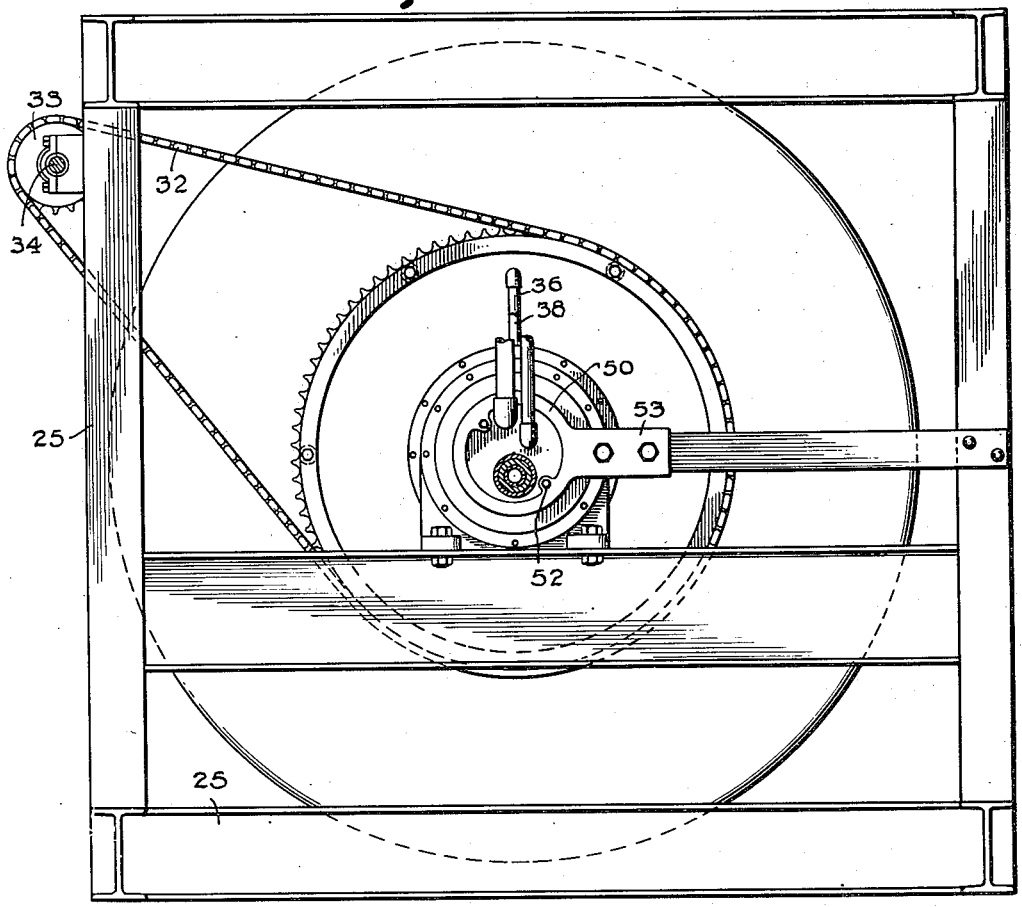
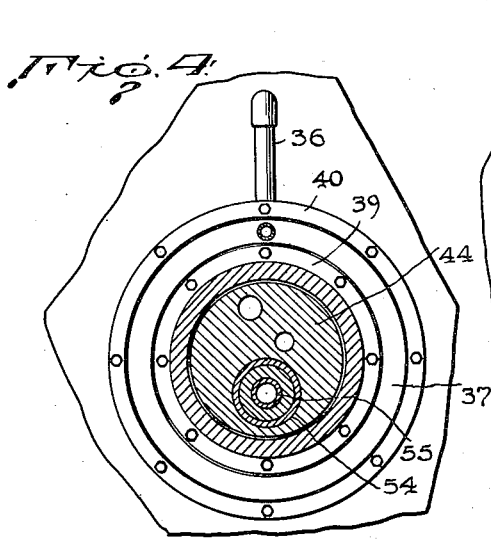
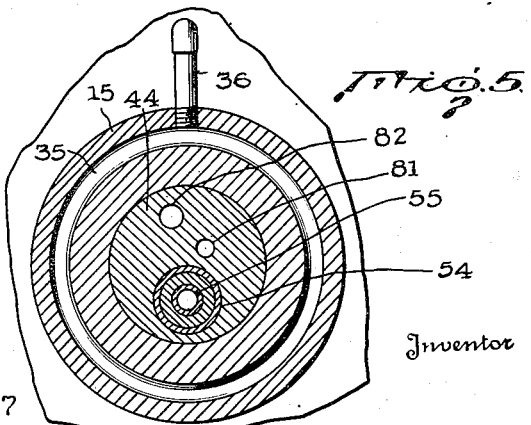
Inventor
SAM E. FINLEY,
By Church &Church
His Attorneys

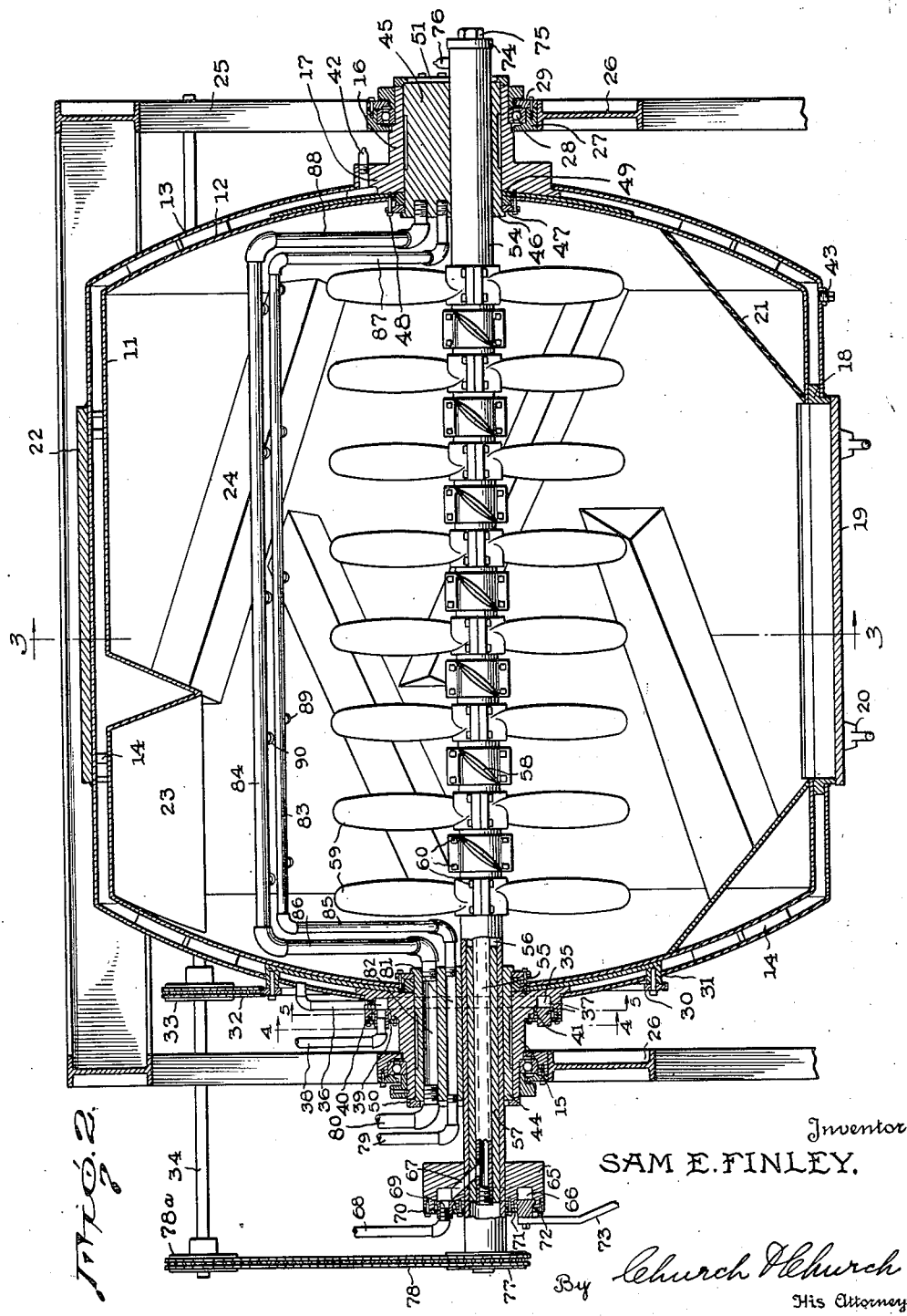

Sept. 16, 1941.  S. E. FINLEY  2,256,281
APPARATUS FOR PREPARING BITUMINOUS CEMENT AGGREGATE COMPOSITIONS
Filed March 25, 1940  3 Sheets-Sheet 3
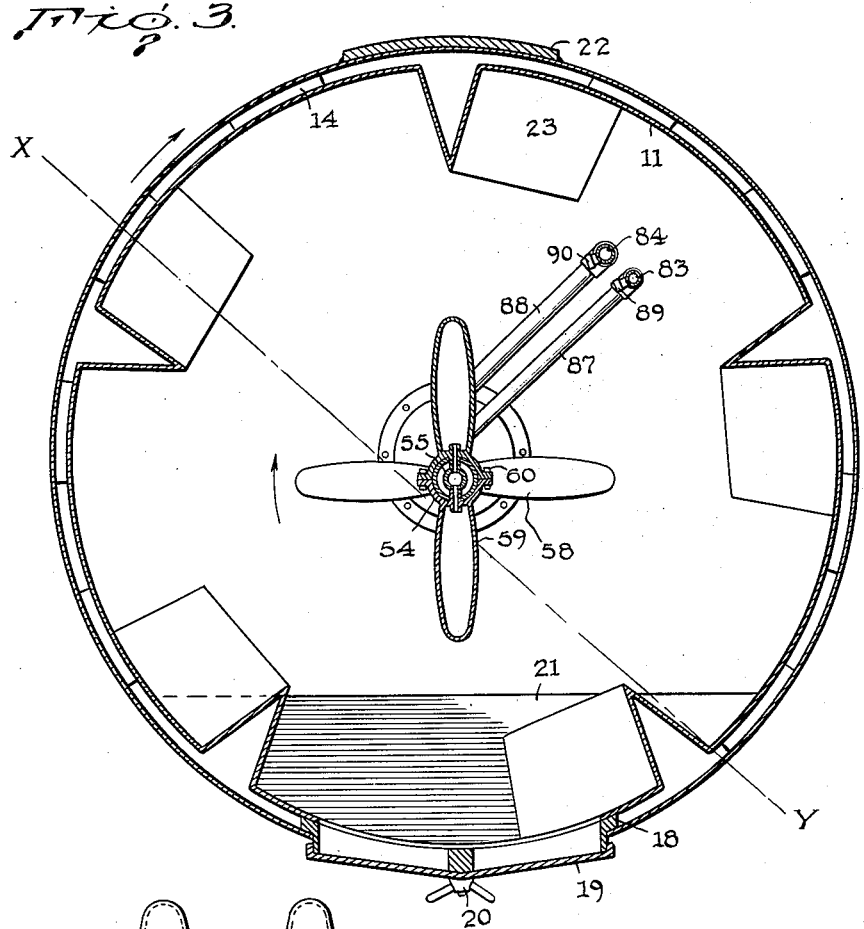
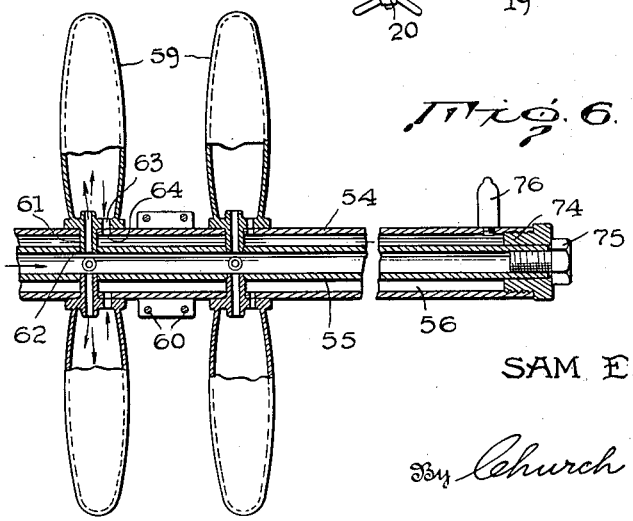
SAM E. FINLEY, Inventor
By Church & Church
His Attorneys Patented Sept. 16, 1941

2,256,281

UNITED STATES PATENT OFFICE 2,256,281

APPARATUS FOR PREPARING BITUMINOUS CEMENT AGGREGATE COMPOSITIONS

Sam E. Finley, Atlanta, Ga.

Application March 25, 1940, Serial No. 325,888

5 Claims. (Cl. 259—157)

This invention relates to apparatus for preparing bituminous cement-aggregate compositions, and more particularly to apparatus for forming a uniform and homogeneous mixture of the ingredients of such a composition. Bituminous cement-aggregate compositions are extensively used for surfacing roadways, pavements, roofs, floors and the like, and are formed of aggregate, such as crushed stone, gravel, slag, shell or the like, and a bituminous or binding material or materials. The aggregate is composed of particles of various sizes, and in order that the roadway or other surface will be durable it is essential not only that the particles be completely and uniformly coated with the bituminous cement but also that the particles of each particular size be uniformly distributed in the mass, that is to say, that the batch be homogeneous both as to cement content and as to content of paritcles of any particular size of aggregate, and that it be free of lumps.

In some instances it is desirable to use two or more different liquid bituminous cements, one after the other, such cements differing mainly as to viscosity. The present invention relates, however, not to the particular type or types, or proportions of aggregate or bituminous cement used, or to the methods of preparing them before introducing them into the mixing apparatus, but to the apparatus for mixing the aggregate and bituminous cement to produce a homogeneous composition.

One of the principal objects of my invention is to provide apparatus for this use that will insure homogeneity of the mixed composition in all regards, and thus will insure durability of the surface formed by such composition.

Another important object of the invention is to provide apparatus by which such a homogeneous composition may be produced economically.

Still further objects of the invention are to provide efficient apparatus for this purpose that will be durable and simple in structure, and to provide an apparatus of this kind which, in spite of the size and weight necessitated by the nature and quantities of the materials which it must handle, may be moved with comparative ease from one road-building-site to another.

Still further objects of the invention as well as novel features of construction and operation will definitely appear from the following description of a preferred specific embodiment of the invention which is illustrated in the accompanying drawings, in which:

Figure 1 is a view in end elevation of a structure embodying the invention;

Fig. 2 is a view in central, vertical longitudinal section of the structure shown in Fig. 1, certain of the parts being broken away;

Fig. 3 is a view in vertical section, taken on the line 3—3 of Fig. 2;

Figs. 4 and 5 are enlarged views in vertical section, taken on the lines 4—4 and 5—5, respectively, of Fig. 2; and Fig. 6 is an enlarged fragmentary view in side elevation, parts being broken away to show certain details in section, of one end of the agitating-blade shaft.

In general, the invention comprises the provision of a drum rotated about its axis, which is substantially horizontal, and having blades therein which catch and elevate and cascade successive quantities of the aggregate, a plurality of variously inclined blades rotated in the same direction as the drum, so that they will meet and agitate and disperse the cascading aggregate, and a conduit fixed in the upper part of the drum for spraying the liquid bituminous cement downwardly upon the dispersed aggregate, it being preferable that the drum and its elevating blades and the agitating or dispersing blades be provided with means for circulating a heating fluid therethrough in order to keep the mass uniformly heated and plastic.

The aggregate may merely be crushed, or it may be crushed and screened to definite sizes which are then mixed in desired proportions. If necessary, the aggregate may be washed to rid it of soil and clay and, since it is essential that it be heated in any case to a temperature of from 200° to 400° F., it may be heated before it is placed in the mixing apparatus, if desired.

The bituminous cement may be any form of bitumen, whether derived from natural asphalt or coal tar, and the consistency and viscosity or wetting ability may vary depending upon the particular characteristics desired in the finished composition or the road surface made therefrom. In any case the bituminous cement is applied in liquid form, and it may be rendered liquid and brought to the desired viscosity in any of the well known ways as, for instance, by the application of heat, by admixture with a highly volatile solvent such as naphtha and similar volatile distillates to form what are commonly termed "cut backs," by the formation of a bituminous emulsion in a suitable liquid vehicle or, if the liquid bitumen is a straight-run residual oil produced by distillation of an asphaltic-base crude oil, by varying the temperature at which the distillation is stopped.

The embodiment of the present invention illustrated in the drawings comprises a substantially cylindrical drum 11, preferably having slightly bulged spherical ends 12, such drum being substantially enclosed in a casing 13 that is uniformly spaced from the outer surface of the drum by reinforcing fillets 14 which are attached, by welding or the like, to both the drum and the casing. Supporting trunnions 15 and 16 are provided at the ends of the drum, having flanges 17 to which the end walls of the drum and of the casing are welded, or otherwise rigidly secured. A suitable manhole ring 18 is provided, having a cover 19 detachably secured thereto by studs and wing-nuts 20 or other suitable means, and inclined braces 21 are preferably welded to the manhole ring and to the end walls of the drum to increase the rigidity, a suitable counterweight 22 being preferably welded to the outside of the casing opposite the manhole to preserve the balance of the drum structure as a whole.

The drum is provided on its interior surface with two series of inclined hollow elevating or cascading blades 23 and 24, one series extending axially from each end of the drum past the midpoint thereof, such blades being inclined in the same circumferential direction from a line parallel to the axis of the drum, and the blades 23 of one series being in staggered relation to, and with their ends overlapping the ends of, the blades 24 of the other series. These blades 23 and 24 are preferably of substantially triangular shape in cross section, and may be formed integrally with the cylindrical wall of the drum, or they may be separately formed and welded or riveted to the drum.

A suitable supporting framework 25 is provided, formed preferably of I-beams comprising, in addition to base members, top members and the vertical members connecting them, horizontal end members 26 upon which are secured bearing members 27 in which there are supported ball bearings 28 which fit upon and rotatably support the trunnions 15 and 16 of the drum 11, and are held in place by rings 29. A sprocket gear ring 30 is supported on the left-hand end of the drum 11 as viewed in Fig. 2, upon a plurality of studs 31 that are welded to the ends 12 of the drum and its casing 13, and a sprocket chain 32 engaging the toothed ring 30 is provided for rotating the drum, being driven from a sprocket wheel 33 on a shaft 34 suitably supported on vertical members of the framework 25.

In order to provide for the circulation of steam, or other heating fluid, through the steam-jacket formed by the spacing between the drum 11 and its casing 13, an annular channel 35 is formed in the trunnion 15, and is connected, as by a pipe 36 with such steam-jacket space. The open side of such channel 35 is closed by a fixed ring 37, having a supply pipe 38 passing therethrough, such ring 37 being held against the trunnion by an inner annular plate 39 and an outer annular plate 40 secured by screws or similar means to the trunnion. It will be understood that, as the drum is rotated, the pipe 38 and its ring 37 remain fixed, while held from axial movement by the annular plates 39 and 40 which rotate with the trunnion, and that a suitable packing ring 41 may be provided, if desired, between the plates 39 and 40 and the ring 37. At the opposite end of the drum, an escape valve 42 is provided to permit escape of the steam when any predetermined pressure is reached, and an outlet 43 may be provided to permit draining of condensate, if desired.

Fitting in axial bores in the trunnions 15 and 16 are fixed cylindrical bearing members 44 and 45, respectively, each having on its inner end a flange 46, engaging a ring 47 secured by screws 48 to the inner face of the end of the drum to hold in place a packing ring 49 that surrounds the bearing member 44 or 45. To the outer end of each of the bearing members 44 and 45 there are secured, respectively, retaining and anchoring plates 50 and 51, as is best illustrated in Fig. 1, such plates being secured to the bearing members by screws 52 and each having an extension 53 that is rigidly secured from rotation, as for instance by being anchored to one of the vertical members of the drum-supporting frame.

In the fixed bearing members 44 and 45 there is mounted a hollow rotatable shaft 54 carrying agitating blades. Since the bearing members are fixed, it is not necessary that the axis of the shaft 54 coincide with the axis of the drum and in the construction shown it is slightly below the axis of the drum. The hollow shaft 54 may be conveniently formed as a tube having within it a second tube 55 sufficiently smaller to leave a space 56 between them. As shown the left hand end of the smaller tube 55 is closed and held in spaced relationship by a plug 57 secured to the end of the inner tube and filling the end of the outer tube or shaft 54. The agitating blades are hollow and arranged in pairs, the blades of a pair extending radially in opposite directions from the shaft. Each of the blades is twisted approximately at an angle of 45 degrees to the plane perpendicular to the shaft through its base, the two blades of each pair being twisted in the same direction, but the blades of each pair being twisted in a direction opposite to that of the preceding pair and the following pair. Thus, when the blades are rotated those of the even-numbered pairs of blades 58 tend to move the particles of aggregate which they strike toward one end of the drum, and the blades 59 of the odd-numbered pairs tend to move the particles of aggregate toward the other end of the drum. The blades 58 of the even-numbered pairs are likewise spaced at an angle of 90 degrees circumferentially about the shaft from the position of the blades 59 of the odd-numbered pairs. As shown in the drawings the blades are substantially flat, but it will be understood that, if desired, they may be of a shape similar to that of an airplane-propeller.

Each of the blades is hollow and formed with an integral flanged semi-cylindrical base, as shown in Figs. 2, 3 and 6, the flanges of each pair of blades being clamped together upon the shaft 54 by bolts 60, a suitable key being provided if desired. Each of the blades is provided with a tubular extension 61 which passes through an opening in the outer tube 54 and is tapered to fit in a tapered opening 62 in the inner tube 55, as shown in Fig. 6, and each blade is also provided with an opening 63 in its base aligning with an opening 64 in the outer tube 54. In order to provide for supplying steam, or other heating fluid, to the agitating blades, an annular member 65 is secured on one end of the shaft 54 and provided with an annular channel 66 in its outer face connected by a port 67 with the inner tube 55. A supply pipe 68 connects with a ring 69 which closes the channel 66 and is preferably surrounded by a packing ring secured from endwise movement by an inner ring 71 and an outer ring 72 secured in any suitable manner to the annular member 65. A brace 73 may be secured to the ring 69 and to the framework to securely hold said ring from rotating. As shown the other end of the shaft 54 may be closed by a screw plug 74, through which a stud 75 passes and is threaded into the end of the inner tube 55 to close the same. An escape valve 76 is preferably provided, connecting with the space between the tubes 54 and 55, and if it is desired to recirculate a heating medium, without permitting it to escape, a structure may be used for the outlet that is similar in all respects to that provided for inlet of the heating medium at the other end of the shaft.

A sprocket wheel 77 is secured to the end of the shaft 54 and connected by a driving chain 78 to a sprocket wheel 78a as shown, on shaft 34, so that the agitator blade shaft will be rotated in the same direction as the drum. The sizes of the driving and driven sprockets are preferably such that the agitator blade shaft is rotated three or four times during one rotation of the drum, and it will be understood that any suitable power transmitting means might be used instead of sprockets and chains.

In order to supply liquid bitumen to the moving aggregate within the drum, supply pipes 79 and 80 are connected to openings 81 and 82, in the fixed bearing member 44, and headers 83 and 84 are connected at one end by pipes 85 and 86, to such openings, and are supported at their other ends, as by pipes or other supports 87 and 88, upon the fixed bearing member 45. The headers 83 and 84 are each provided with a plurality of downwardly-directed spray nozzles 89 and 90, respectively, the headers being preferably displaced somewhat from the central vertical plane of the drum in the direction of rotation of the drum, as shown in Fig. 3. The angle of such displacement is preferably about 45 degrees for a reason that will presently appear.

In use a charge of aggregate is deposited in the drum through the manhole 18, and the manhole is closed, the volume of the charge being preferably slightly less than half of the volume of the drum. The drum is rotated clockwise, that is, in the direction of the arrow as shown in Fig. 3, and as the elevating blades raise successive quantities of aggregate from the total mass of aggregate such quantities successively slide from the blades and are cascaded downwardly along the upper surface of the mass. The total mass of aggregate would then present, if the agitator blades 58 and 59 were not rotated, an upper surface of downwardly sliding or cascading particles moving substantially in the plane of the line X—Y of Fig. 3. The speed of rotation of the drum is preferably such that the inclination of this moving surface of the cascading material is only slightly greater than the inclination of the "angle of repose" characteristic of such material. It is preferable that the bitumen-spraying nozzles 89 and 90 be so positioned as to spray in a direction substantially normal to this cascading surface and, in order to minimize the danger of clogging of the spray nozzles, it is likewise preferable that they be positioned well out of the path of moving particles.

As the particles of aggregate cascade down the upper surface of the mass they are met by the upwardly moving agitating blades 58 and 59, all of which tend to raise and disperse the particles that they strike, while the blades 58 tend to move them in one direction axially of the drum and the blades 59 tend to move them in the opposite direction. At the same time, the inclination of the elevating blades 23 and 24 of the rotating drum continuously effects a movement of the aggregate from the ends of the drum toward its central portion. The effect of the agitating blades 58 and 59 in dispersing the particles and causing what may be termed a "swell" is of the utmost importance because the fact that they are so dispersed and separated and moving when in the path of the sprayed bitumen permits the bitumen to enter between particles and insures a rapid, complete and uniform coating of the particles, while at the same time the action of the agitating blade prevents the formation of any lumps.

As stated heretofore, the dispersing blades 58 and 59 are provided to meet and agitate and disperse the cascading particles of aggregate, that is to say, to raise and disperse the particles that they strike and drive them apart, thus causing the desired "swell." While it has been stated that the agitating blades move the particles axially or lengthwise of the drum it must be understood that such motion is not in a path parallel to the axis of the drum, and that the lifting of the particles does not effect a movement vertically from its point of impact. On the contrary, upon impact of a particle with the angularly disposed flat side of one of the dispersing blades 58 or 59 the particle is given a spinning motion, similar to the motion of a baseball after a "foul tip," and at the same time the particle is projected in a path which has a component axially or lengthwise of the drum as well as a component vertically from the horizontal plane through its point of impact, and also in most instances a component laterally from the vertical plane parallel to the axis and passing through the point of impact. It will be apparent that the values of each of such components of motion, as well as the speed of rotation or "spinning," of each particle will be dependent upon the speed and direction of movement of the particle at the instant of impact, which may vary slightly, and upon the speed and slope of that point of the blade with which it contacts, it being evident that the speed of any particular point on the blade surface will vary with its distance from the axis of rotation. It is this variation of the direction of movement of the particles and the spinning action of the particles resulting from the angular positioning of the blades which effects the uniform dispersion and separation of the particles, or "swell," and which effects the uniform and complete coating of the particles because they are so dispersed and spinning as they pass through the spray of liquid bitumen.

The charge of aggregate is preferably mixed for a short time, with steam circulating through the steam-jacket and through the elevating and agitating blades, in order to insure that the particles are at a sufficiently high temperature and that particles of each particular size are uniformly mixed and distributed. While the rotation of the drum and agitating blades and the circulation of steam are continued, a charge of liquid bituminous material, or a plurality of charges of differing viscosity, and in sequence, as desired, are forced, preferably by the use of compressed air, through the spraying nozzles, and the spraying period is preferably followed by a short period of continued mixing, after which the manhole cover is removed and the charge is dumped and used. While the duration of the mixing and spraying periods vary, depending upon the type of aggregate and liquid bituminous materials employed, a five-ton batch of thoroughly homogeneous bitumen-cement-aggregate compositions can be prepared with this apparatus, under normal conditions, in an operating time of about three minutes.

What is claimed is:

1. Apparatus for preparing bituminous cement-aggregate compositions, comprising a substantially cylindrical drum having internal elevating and cascading blades extending lengthwise of said drum and inclined circumferentially of said drum, said drum being rotatable about a substantially horizontal axis coincident with the axis of said drum, a fixed member fitting in an axial bore at one end of said drum, a shaft mounted in said fixed member for rotation independently of rotation of said drum, agitating blades on said shaft inclined relative to planes therethrough perpendicular to said shaft, the inclination of various of said blades being opposite to that of others of said blades, means for rotating said drum and said shaft, a conduit rigidly carried by said fixed member extending parallel to and above the axis of said drum outside the path of movement of said blades and having downwardly directed outlets, and means for supplying a bituminous cementing medium to said conduit through said fixed member.

2. Apparatus for preparing bituminous cement-aggregate compositions, comprising a substantially cylindrical drum having a steam-jacket, said drum being provided with hubs at its ends, means engaging said hubs supporting said drum for rotation about a substantially horizontal axis, one of said hubs having an axial bore, a fixed member fitting in said bore, a hollow shaft provided with hollow agitating members and rotatably mounted in said fixed member, means for supplying a heating fluid to said steam-jacket and said agitating member, means for rotating said drum and said shaft, said drum having hollow blades projecting inwardly from the inner cylindrical surface thereof and inclined relative to the axis of said drum, and a conduit rigid with said fixed member and having a downwardly-directed outlet in the upper portion of said drum.

3. Apparatus for preparing bituminous cement-aggregate compositions, comprising a drum having internal hollow elevating and cascading blades rigid therewith, a casing positioned about said drum and rigidly secured in spaced relation thereto to form a steam-jacket communicating with the interior of said blades, said drum being rotatable about a substantially horizontal axis coincident with the axis of said drum and having an axial bore at one end, a fixed member received in said bore, a hollow shaft mounted in said fixed member for rotation independently of rotation of said drum and provided with hollow agitator members, means for rotating said drum and said shaft in the same direction at different speeds, means for supplying a heating fluid to said steam-jacket and to the interior of said shaft and said agitator members, and a conduit extending through said fixed bearing member and having an outlet above the central horizontal plane through said drum.

4. Apparatus for preparing bituminous cement-aggregate compositions, comprising a substantially cylindrical drum having internal elevating and cascading blades projecting inwardly from the peripheral wall thereof and extended lengthwise of the drum, said drum being rotatable about a substantially horizontal axis coincident with the axis of said drum, said drum having an axial opening at one end, a fixed member closing said opening, a shaft rotatably carried by said fixed member and having agitating blades rigid therewith within said drum, said blades being inclined relative to planes perpendicular to said shaft, means for rotating said drum and said shaft in the same direction, and a conduit fixedly supported in said drum and having a downwardly directed outlet in the upper portion of said drum.

5. Apparatus for preparing bituminous cement-aggregate compositions, comprising a drum supported for rotation about a substantially horizontal axis coincident with the axis of the drum, a steam-jacket attached to the exterior of said drum and rotatable therewith, a fixed member fitting an axial bore at one end of said drum, a shaft mounted in said fixed member for rotation about a fixed axis substantially coincident with the axis of said drum, agitating blades rigid with said shaft within said drum, hollow elevating blades extending inwardly from the peripheral wall of said drum and communicating with said steam-jacket, means for supplying a heating fluid to said steam-jacket and said elevating blades, means for rotating said drum and said shaft, and a fixed conduit within said drum for supplying a bituminous cementing medium and having an outlet at a point above the central horizontal plane of said drum.

SAM E. FINLEY.